United States Patent [19]

Okitu et al.

[11] Patent Number: 4,663,428

[45] Date of Patent: May 5, 1987

[54] POLYESTERAMIDE

[75] Inventors: Kiyoshi Okitu; Shiogi Watanabe, both of Ohtake, Japan

[73] Assignee: Daicel Chemical Industries, Ltd., Sakai, Japan

[21] Appl. No.: 772,599

[22] PCT Filed: Dec. 26, 1984

[86] PCT No.: PCT/JP84/00616

§ 371 Date: Aug. 20, 1985

§ 102(e) Date: Aug. 20, 1985

[87] PCT Pub. No.: WO85/02852

PCT Pub. Date: Jul. 4, 1985

[30] Foreign Application Priority Data

Dec. 27, 1983 [JP] Japan ................... 58-251016

[51] Int. Cl.$^4$ .................. C08G 69/08; C08G 69/14; C08G 63/44

[52] U.S. Cl. .................. 528/324; 528/292; 528/302; 528/326

[58] Field of Search ................ 528/292, 302, 324, 326

[56] References Cited

U.S. PATENT DOCUMENTS

| | | | |
|---|---|---|---|
| 3,169,945 | 2/1965 | Hostettler et al. | 528/354 X |
| 4,096,125 | 6/1978 | Smith et al. | 525/437 X |
| 4,345,066 | 8/1982 | Rüter | 528/324 |
| 4,380,622 | 4/1983 | Chiba et al. | 528/292 X |
| 4,415,728 | 11/1983 | Tremblay | 528/302 X |

Primary Examiner—Lucille M. Phynes
Attorney, Agent, or Firm—Flynn, Thiel, Boutell & Tanis

[57] ABSTRACT

A polyesteramide is prepared by reacting
(1) at least one polyamide-forming compound selected from the group consisting of amino carboxylic acids having 6 to 12 carbon atoms, lactams having 6 to 12 carbon atoms and nylon salts comprising dicarboxylic acids having 4 to 12 carbon atoms and diamines having 4 to 12 carbon atoms,
(2) a dicarboxylic acid having 4 to 54 carbon atoms, and
(3) a polycaprolactonediol having an average molecular weight of 200 to 2,500 or 4,500 to 10,000; and is good at heat stability.

10 Claims, No Drawings

POLYESTERAMIDE

TECHNICAL FIELD

The present invention relates to colorless polyesteramides having excellent heat resistance and water resistance which are obtained from at least one polyamide-forming compound selected from the group consisting of amino carboxylic acids, lactams and nylon salts, a dicarboxylic acid and a polycaprolactonediol. The polyesteramides of the invention are useful particularly for the production of parts of electric appliances.

BACKGROUND ART

Polyetheresteramides have attracted attention recently as new materials for elastomers. Particularly, they have excellent weight reduction, low-temperature properties, chemical resistance, oil resistance, sound-damping qualities and moldability. The demand of them is expected in the production of automobile hoses, tubes, rubber for wipers and soles of sport shoes as well as in other fields wherein a strict hygienic control is required, such as food and medical appliances.

The polyetheresteramides have defects that they are colored due to a decomposition reaction in the course of the polymerization and that their mechanical and physical properties are deteriorated during the use at a high temperature, while polyesteramides have a defect of poor water resistance.

After intensive investigations made for the purpose of producing colorless polyamide elastomers having excellent weight reduction, low-temperature properties, chemical resistance, oil resistance, sound-damping qualities, moldability, heat resistance and water resistance, the inventors have found that the above-mentioned polyamide elastomers can be obtained by reacting (1) at least one polyamide-forming compound selected from the group consisting of amino carboxylic acids, lactams and nylon salts, (2) a dicarboxylic acid and (3) a polycaprolactonediol. The present invention has been completed on the basis of this finding.

DISCLOSURE OF INVENTION

The polyesteramides of the present invention are obtained by reacting:

(1) at least one polyamide-forming compound selected from the group consisting of amino carboxylic acids having 6 to 12 carbon atoms, lactams having 6 to 12 carbon atoms and nylon salts comprising dicarboxylic acids having 4 to 12 carbon atoms and diamines having 4 to 12 carbon atoms, (2) a dicarboxylic acid having 4 to 54 carbon atoms, and (3) a polycaprolactonediol having an average molecular weight of 200 to 2,500 or 4,500 to 10,000.

The polycaprolactonediol (3) may be replaced with a polycaprolactonepolyol comprising a mixture of 99.9 to 70 wt. % of a polycaprolactonediol having an average molecular weight of 200 to 10,000 and 0.1 to 30 wt. % of a polycaprolactonepolyol having an average molecular weight of 200 to 10,000 and at least three functional groups.

The polyesteramide obtained from the polycaprolactonediol (3) having an average molecular weight of 4,500 to 10,000 according to the present invention has a melting point of 60° to 150° C. This polyesteramide has advantages as will be described below, though the polycaprolactone component constituting it has such a high molecular weight.

A high molecular weight polycaprolactone (trade name:PLACCEL H; a product of Daicel Ltd.) is a crystalline, thermoplastic polymer having a recurring structure comprising simple units of methylene and ester groups. Since this polymer has a melting point of a low as 60° C. and a high compatibility with various resins, it has been used as a starting material for gypsum, shoe paddings, hot-melt adhesives and additives for various resins (such as agents for improving a gloss, surface smoothness and dyeability and plasticizing agent).

However, the high molecular weight polycaprolactones have problems of an excessively low melting point and insufficient flexibility due to their high crystallizability. Thus it has been demanded to solve these problems.

When the polycaprolactonediol (3) is mixed with an at least trifunctional polycaprolactonepolyol, a polyesteramide having a rubbery elasticity and excellent elastic recovery can be obtained. With this elastomer having the rubbery elasticity and keeping the characteristic properties of the polyamide elastomer, the defects of the conventional elastomers can be overcome.

The polyamide elastomers produced in the prior art are linear block copolymers comprising a hard segment having a high molecular aggregation power and a soft segment having a rubbery elasticity and a low Tg. These polyamide elastomers have a rubbery elasticity lower than that of vulcanized rubbers, since physical crosslinking points in the hard segment correspond to chemical crosslinking points in the vulcanized rubbers.

The polyesteramides of the present invention are produced by reacting an initiator, an ε-caprolactone or 6-hydroxycaproic acid, a polyamide-forming compound and a dicarboxylic acid. The embodiments of the processes are as follows:

(A) a process wherein the ε-caprolactone is added to the initiator by a ring-opening reaction to form a polycaprolactonediol, which is then polycondensed with the polyamide-forming compound and the dicarboxylic acid, (B) a process wherein the polyamide-forming compound is reacted with the dicarboxylic acid to form a dicarboxylic acid polyamide, which is then polycondensed with the polycaprolactonediol obtained in (A), (C) a process wherein the dicarboxylic acid polyamide obtained in (B) is subjected to a ring-opening polycondensation reaction with the initiator and the ε-caprolactone, and (D) a process wherein the initiator, ε-caprolactone, polyamide-forming compound and dicarboxylic acid are subjected to a ring-opening polycondensation reaction.

When the polycaprolactonepolyol mixture is to be used, the diol in the above-mentioned processes is replaced with the polyol mixture.

ε-Caprolactone used in the production of the polyesteramide of the present invention are produced on an industrial scale by oxidizing cyclohexanone with peracetic acid according to the Baeyer-Villiger reaction. The ε-caprolactone may be used in combination with other lactones such as a four-membered propiolactone provided that the characteristic features of the present invention are not damaged.

Examples of the amino carboxylic acids having 6 to 12 carbon atoms herein used include 6-aminocaproic, 7-aminocaprylic, 8-aminocapric, ω-aminoenanthic, ω-aminopelargonic, 11-aminoundecanoic and 12-aminododecanoic acids, among which 6-aminocaproic, 11-aminoundecanoic and 12-aminododecanoic acids are preferred. The lactams having 6 to 12 carbon atoms include caprolactam, enantholactam, capryllactam and lauryllactam, among which caprolactam and lauryllactam are preferred. Examples of the nylon salts comprising a dicarboxylic acid having 4 to 12 carbon atoms and a diamine having 4 to 12 carbon atoms include salts of adipic acid with hexamethylenediamine, sebacic acid with hexamethylenediamine, isophthalic acid with hexamethylenediamine and terephthalic acid with trimethylhexamethylenediamine.

Examples of the dicarboxylic acids having 4 to 54 carbon atoms used herein include aromatic dicarboxylic acids such as phthalic, isophthalic, terephthalic, naphthalene-2,6-dicarboxylic, naphthalene-2,7-dicarboxylic, diphenyl-4,4'-dicarboxylic and diphenoxyethanedicarboxylic acids; alicyclic dicarboxylic acids such as 1,4-cyclohexanedicarboxylic, 1,2-cyclohexanedicarboxylic, and dicyclohexyl-4,4'-dicarboxylic acids; and aliphatic dicarboxylic acids such as succinic, oxalic, adipic, sebacic, dodecanedioic and dimer acids. Among them, terephthalic, isophthalic, 1,4-cyclohexanedicarboxylic, adipic, sebacic, dodecanedioic and dimer acids are particularly preferred.

The polycaprolactonediols used in the present invention have an average molecular weight of 200 to 2,500 or 4,500 to 10,000, since defects inherent to the high molecular polycaprolactones will appear when the average molecular weight thereof exceeds 10,000.

The polycaprolactonepolyols used in the present invention are mixtures of 99.9 to 70 wt. % of a polycaprolactonediol having an average molecular weight of 200 to 10,000 and 0.1 to 30 wt. % of a polycaprolactonepolyol having an average molecular weight of 200 to 10,000 and at least three functional groups, since no effect can be obtained when the amount of the polycaprolactonepolyol having at least three functional groups is less than 0.1 wt. %, while the composition will gel easily in the course of the production of the intended product when it is larger than 30 wt. %.

The diols used as the initiator (3) in the present invention are represented usually by the general formula, HO—R—OH, wherein R represents an aromatic hydrocarbon group having 1 or 2 aromatic rings, alicyclic hydrocarbon group having 4 to 37 carbon atoms, saturated or unsaturated aliphatic group having 1 to 30 carbon atoms, a polyester residue having an average molecular weight of 200 to 6,000 or a polyalkylene glycol residue having an average molecular weight of 200 to 6,000.

Examples of the initiators include resorcinol, pyrocatechol, hydroquinone, pyrogallol, phloroglucinol, bisphenol A, bisphenol F and ethylene oxide adducts of them, dimethylolbenzene, cyclohexanedimethanol, ethylene glycol, diethylene glycol, triethylene glycol, propylene glycol, dipropylene glycol, 1,4-butanediol, 1,3-butanediol, 2-methyl-1,3-propylene glycol, neopentyl glycol, 1,5-pentanediol and 1,6-hexanediol; polyesterpolyols having an average molecular weight of 200 to 6,000 formed from a dicarboxylic acid such as terephthalic, isophthalic, adipic, sebacic, undecanedioic or dodecanedioic acid and a diol such as ethylene glycol, diethylene glycol, triethylene glycol, propylene glycol, 1,4-butanediol, neopentyl glycol, 1,5-pentanediol or 1,6-hexanediol; polyethylene glycol, polypropylene glycol and polytetramethylene glycol having an average molecular weight of 200 to 6,000; block or random copolymers of ethylene oxide and propylene oxide; and block or random copolymers of ethylene oxide and tetrahydrofuran.

The polyol mixtures used as the initiator (3) include compounds of the following general formula:

$$R\text{-(OH)}_l$$

wherein R represents an aromatic hydrocarbon group having 1 or 2 aromatic rings, an alicyclic hydrocarbon group having 4 to 37 carbon atoms, a saturated or unsaturated aliphatic group having 1 to 30 carbon atoms, a polyesterpolyol residue having an average molecular weight of 200 to 6,000 or a polyalkylene glycol residue having an average molecular weight of 200 to 6,000, and $l$ represents an integer of 2 to 8.

Examples of the compounds of the above formula include resorcinol, pyrocatechol, hydroquinone, pyrogallol, phloroglucinol, benzenetriol, bisphenol A, bisphenol F and ethylene oxide adducts of them, dimethylolbenzene, cyclohexanedimethanol, tris(2-hydroxyethyl) isocyanurate, ethylene glycol, diethylene glycol, triethylene glycol, propylene glycol, dipropylene glycol, 1,4-butanediol, 1,3-butanediol, 2-methyl-1,3-propylene glycol, neopentyl glycol, 1,5-pentanediol, glycerol, trimethylolpropane, 1,6-hexanediol, pentaerythritol, sorbitol, glucose, sucrose; polyesterpolyols having an average molecular weight of 200 to 6,000 formed from a dicarboxylic acid such as terephthalic, isophthalic, adipic, sebacic, undecanedioic or dodecanedioic acid and a polyol such as ethylene glycol, diethylene glycol, triethylene glycol, propylene glycol, 1,4-butanediol, neopentyl glycol, 1,5-pentanediol, 1,6-hexanediol, trimethylolpropane, glycerol, pentaerythritol and sorbitol; polyethyleneglycol, polypropylene glycol and polytetramethylene glycol having an average molecular weight of 200 to 6,000; block or random copolymers of ethylene oxide and propylene oxide; and block or random copolymers of ethylene oxide and tetrahydrofuran.

The ring-opening addition reaction of ε-caprolactone with the hydroxyl groups of the initiator is carried out at a temperature of 100° to 230° C. preferably in the presence of a catalyst. Examples of the catalysts include titanium compounds such as tetrabutyl titanate, tetrapropyl titanate and tetraethyl titanate, organotin compounds such as tin octylate, dibutyltin oxide and dibutyltin dilaurate; and tin halides such as stannous chloride, stannous bromide and stannous iodide. The amount of the catalyst is 0.01 to 1000 ppm, preferably 0.2 to 500 ppm.

ε-Caprolactone may be replaced with 6-hydroxycaproic acid.

The polycondensation reaction in the present invention may be conducted by an ordinary process wherein the reaction is conducted under stirring in the presence of the catalyst at a temperature of 220° to 280° C. in a high vacuum of up to 5 mmHg, preferably up to 1 mmHg. In the polycondensation reaction, the amounts of the reactants are controlled so that the proportions of the carboxyl group, amino group and hydroxyl group in the polyamide-forming compound, dicarboxylic acid and aliphatic polyester would be in the following range:

$$0.95 \leq [\text{COOH}]/([\text{NH}_2]+[\text{OH}]) \leq 1.05$$

in order to obtain an aliphatic polyesteramide having a high degree of polymerization and excellent physical properties.

Preferred catalysts used in the polycondensation reaction include tetraalkyl titanates such as tetramethyl titanate, tetraisopropyl titanate, tetrabutyl titanate, tetra-2-ethylhexyl titanate, tetradodecyl titanate and tetrahexadodecyl titanate; titanium catalysts such as potassium titanium oxalate; tin catalysts such as dibutyltin oxide, dibutyltin dilaurate and monobutyltin oxide; zirconium tetraalkoxides such as zirconium tetrabutoxide and zirconium isopropoxide; hafnium tetraalkoxides such as hafnium tetraethoxide; and lead catalysts such as lead acetate.

Stabilizers such as antioxidant, heat stabilizer and U.V. absorber may be incorporated in the polyesteramide of the present invention in the course of or after the polymerization but before the molding. Examples of the antioxidants and heat stabilizers include hindered phenols such as 4,4'-bis(2,6-di-t-butylphenol), 1,3,5-trimethyl-2,4,6-tris(3,5-di-t-butyl-4-hydroxybenzyl)benzene, tetrakis[methylene-3-(3,5-di-t-butyl-4-hydroxyphenyl)propionatol]methane and N,N'-hexamethylenebis(3,5-di-tert-butyl-4-hydroxyhydrocinnamamide); aromatic amines such as N,N'-bis($\beta$-naphthyl)-p-phenylenediamine and 4,4'-bis(4-$\alpha,\alpha'$-dimethylbenzyl)-diphenylamine; sulfur compounds such as dilaurylthio dipropionate; phosphorus compounds; alkaline earth metal oxides; nickel salts of Schiff bases; cuprous iodide and/or potassium iodide. The U.V. absorbers include substituted benzophenones, benzotriazoles and piperidine compounds such as bis(2,2,6,6-tetramethyl-4-piperidine) sebacate and 4-benzoyloxy-2,2,6,6-tetramethylpiperidine.

The polyesteramides of the present invention may contain any of the additives such as hydrolysis resistance improver, colorant (pigment or dye), antistatic agent, electric conductor, flame retardant, reinforcing agent, filler, lubricant, nucleating agent, releasing agent, plasticizer, adhesive assistant and thickening agent.

Since the polyesteramides of the present invention are colorless and have excellent heat and water resistance, the use of them is expected in the production of automobile hoses, tubes, rubber for wipers and soles of sport shoes as well as heat-resistant adhesives and electric appliances such as gears of small tape recorders of which heat resistance is required particularly.

Particularly, the use of them is expected in the production of gypsums, shoe paddings, hot-melt adhesives and additives for various resins, since the melting point of them can be controlled in the range of 60° to 150° C. by controlling the average molecular weight of the polycaprolactonediol (3) in the range of 4,500 to 10,000 and since the crystallizability of the polycaprolactone can be reduced to such an extent that the characteristic properties of the high molecular polycaprolactone are not damaged.

Best Mode for Carrying Out the Invention

In the following examples, parts are given by weight.

EXAMPLE 1

808.1 parts of dodecanedioic acid was condensed with 6785.9 parts of 12-aminododecanoic acid by dehydration in a 40 l reactor fitted with a strirrer, nitrogen inlet tube, thermometer and dehydration tube to obtain 7026.8 parts of dicarboxylic polyamide having an acid value of 56.2.

Separately, 239.2 parts of ethylene glycol, 7260.8 parts of $\epsilon$-caprolactone and 0.075 part of tetrabutyl titanate were reacted in a 40 l reactor provided with a stirrer, nitrogen inlet tube, thermometer and condensing tube to obtain 7500 parts of a polycaprolactonediol having a hydroxyl value of 56.4. The average molecular weight determined from the hydroxyl value as follows was 1989:

average molecular weight =

$$\frac{56.1 \times \text{(number of functional groups of polyol)}}{\text{(hydroxyl value)}} \times 1000$$

Then, 7026.8 parts of the dicarboxylic polyamide obtained as above, 7500 parts of polycaprolactonediol obtained as above and 1.5 parts of tetrabutyl titanate were put in a 40 l reactor provided with a stirrer, nitrogen inlet tube, thermometer and dehydration tube and the mixture was heated to 200° C. while nitrogen was introduced therein. The stirring was begun after the mixture had been molten. After carrying out the reaction at this temperature for 1 h, the introduction of nitrogen was stopped and pressure was reduced slowly to 1 mm Hg in about 1 h. Thereafter, the temperature was elevated to 250° C. and the reaction was carried out in a high vacuum of up to 1 mm Hg for about 7 h to obtain 14,000 parts of almost colorless polyesteramide.

The obtained polyesteramide had a relative viscosity $\eta_{rel}$ of 1.88 (in 0.5% m-cresol solution at 25° C.) and a melting point of 150° C. (differential thermal analysis). The polyestermide was injection-molded. The physical properties of the product are shown in Table 1.

EXAMPLE 2

310 parts of ethylene glycol, 4690 parts of $\epsilon$-caprolactone and 0.05 part of tetrabutyl titanate were reacted in a 40 l reactor provided with a stirrer, nitrogen inlet tube, thermometer and condensing tube to obtain 5,000 parts of a polycaprolactonediol having a hydroxyl value of 113.4 (the average molecular weight determined from the hydroxyl value: 989.4).

5000 parts of the polycaprolactonediol obtained as above, 698.7 parts of adipic acid, 12-aminododecanoic acid and 1.44 parts of tetrabutyl titanate were placed in a 40 l reactor provided with a stirrer, nitrogen inlet tube, thermometer and dehydration tube to conduct the reaction in the same manner as in Example 1. About 1400 parts of substantially colorless polyesteramide was obtained.

The obtained polyesteramide had a $\eta_{rel}$ of 1.83 and a melting point of 140° C. The physical properties of the injection-molded product are shown in Table 1.

EXAMPLE 3

3828.4 parts of polytetramethylene glycol, 3671.6 parts of $\epsilon$-caprolactone and 0.075 part of stannous chloride were reacted in a 40 l reactor provided with a stirrer, nitrogen inlet tube, thermometer and condensing tube to obtain 7500 parts of a polycaprolactonediol having a hydroxyl value of 56.4 (the average molecular weight determined from the hydroxyl value: 1989).

7500 parts of the polycaprolactonediol obtained as above, 511.6 parts of adipic acid, 7533.5 parts of 6-aminocaproic acid and 1.44 parts of tetrabutyl titanate were placed in a 40 l reactor provided with a stirrer, nitrogen inlet tube, thermometer and dehydration tube to conduct the reaction in the same manner as in Example 1. About 1400 parts of substantially colorless polyesteramide was obtained.

The obtained polyesteramide had a $\eta_{rel}$ of 1.87 and a melting point of 140° C. The physical properties of the injection-molded product are shown in Table 1.

TABLE 1

|  | Melting point (°C.) | Hardness*1 Shore D | Tensile tests*2 | | | |
|---|---|---|---|---|---|---|
|  |  |  | 100% modulus (kgf/cm²) | 300% modulus (kgf/cm²) | Breaking strength (kgf/cm²) | Elongation at rupture (%) |
| Ex. 1 | 150 | 50 | 116 | 156 | 245 | 545 |
| Ex. 2 | 140 | 58 | 159 | 236 | 314 | 478 |
| Ex. 3 | 140 | 48 | 111 | 161 | 237 | 532 |

(Notes)
*1Hardness: determined according to ASTM-D-2240.
*2Tensile tests: determined according to JIS K 7113.

EXAMPLE 4

18.6 parts of ethylene glycol, 1481.4 parts of ε-caprolactone and 0.0015 part of tetrabutyl titanate were placed in a 2 l four-necked separable flask provided with a stirrer, nitrogen inlet tube, thermometer and condensing tube to conduct a ring-opening addition reaction of ε-caprolactone at 170° to 180° in a nitrogen atmosphere to obtain 1500 parts of a polycaprolactonediol having a hydroxyl value of 22.6 (average molecular weight determined from the hydroxyl value: 4938).

Then, 10.9 parts of adipic acid, 122.7 parts of 12-aminododecanoic acid, 419.4 parts of the polycaprolactonediol obtained as above and 0.544 parts of tetrabutyl titanate were placed in a 1 l four-necked separable flask provided with a stirrer, nitrogen inlet tube, thermometer and dehydration tube and the mixture was heated to 200° C. in a nitrogen atmosphere. The stirring was begun after the mixture had been molten. After carrying out the reaction at this temperature for 1 h, the introduction of nitrogen was stopped and pressure was reduced slowly to 1 mmHg in about 1 h. Thereafter, the temperature was elevated to 250° C. and the reaction was carried out in a high vacuum of up to 1 mmHg for about 7 h to obtain 540 parts of substantially colorless polyesteramide.

The obtained polyesteramide had a relative viscosity $\eta_{rel}$ of 1.92 (in 0.5% m-cresol solution at 25° C.) and a melting point of 90° C. as measured with a simple melting point measuring device (no clear melting point could be obtained in the differential thermal analysis because of its low crystallizability). The results of the measurement of physical properties of press-molded product are shown in Table 2. The measurement was conducted in the same manner as in Example 1.

COMPARATIVE EXAMPLE 1

A polycaprolactone (trade name: PLACCEL H-7; a product of Daicel Ltd.) having an average molecular weight of 70,000 was press-molded in the same manner as in Example 4 and physical properties of the product were measured. The results are shown in Table 2.

TABLE 2

|  | Melting point (°C.) | Hardness Shore D | Tensile tests | | | |
|---|---|---|---|---|---|---|
|  |  |  | 100% modulus (kgf/cm²) | 300% modulus (kgf/cm²) | Breaking strength (kgf/cm²) | Elongation at rupture (%) |
| Ex. 4 | 90 | 52 | 34 | 46 | 209 | 1139 |
| High molecular polycaprolactone | 57 | 55 | 134 | 137 | 620 | 813 |

COMPARATIVE EXAMPLE 2

69.6 parts of 12-aminododecanoic acid, 33.3 parts of dodecandioic acid, 298.6 parts of polytetramethylene glycol having a hydroxyl value of 57.2, 0.004 part of tetrabutyl titanate and 0.8 part of an antioxidant (trade name: Irganox 1010; a product of Ciba-Geigy A.G.) were placed in a 2 l four-necked separable flask provided with a stirrer, nitrogen inlet tube, thermometer and dehydration tube and the mixture was heated to 220° C. while nitrogen gas was introduced therein. Then, the reaction was conducted at 220° C. for about 3 h.

Thereafter, the temperature was elevated to 250° C. and the introduction of the nitrogen gas was stopped and the pressure reduction was started. The reaction was conducted at 250° C. under 0.7 mmHg for about 7 h to obtain 380 parts of substantially colorless polyetheresteramide.

The obtained polyetheresteramide had a relative viscosity $\eta_{rel}$ of 1.95 (in 0.5% m-cresol solution at 25° C.) and a melting point of 153° C. (differential thermal analysis). The polyetheresteramide was press-molded. The physical properties of the product are shown in Table 3.

EXAMPLE 5

46.5 parts of ethylene glycol, 1453.5 parts of ε-caprolactone and 0.0015 part of tetrabutyl titanate were placed in a 2 l four-necked separable flask provided with a stirrer, nitrogen inlet tube, thermemeter and condensing tube to conduct a ring-opening addition reaction of ε-caprolactone at 170° to 180° C. in a nitrogen atmosphere. 1500 parts of a polycaprolactonediol having a hydroxyl value of 56.4 was obtained (average molecular weight determined from the hydroxyl value: 1988) (hereinafter referred to as polycaprolactonediol A).

100.5 parts of trimethylolpropane, 1399.5 parts of ε-caprolactone and 0.0015 part of tetrabutyl titanate were placed in the same separable flask as above and reacted in the same manner as in the preparation of the polycaprolactonediol A to obtain 1500 parts of polycaprolactonetriol having a hydroxyl value of 84.2 (average molecular weight determined from the hydroxyl value: 1999) (hereinafter referred to as polycaprolactonetriol B).

460 parts of dodecanedioic acid was condensed with 960.4 parts of 12-aminododecanoic acid by dehydration in a 2 l four-necked separable flask provided with a stirrer, nitrogen inlet tube, thermometer and dehydration tube to obtain 1420.4 parts of dicarboxylic polyamide having an acid value of 167.5 (hereinafter referred to as dicarboxylic polyamide C).

Thereafter, 87.9 parts of the dicarboxylic polyamide C obtained as above, 255.2 parts of polycaprolactonediol A, 13 parts of polycaprolactonetriol B and 0.036 part of tetrabutyl titanate were placed in a 1 l four-necked separable flask provided with a stirrer, nitrogen inlet tube, thermometer and dehydration tube. The reaction was conducted in the same manner as in Comparative Example 1 to obtain about 350 parts of substantially colorless polyesteramide The obtained polyesteramide had a $\eta_{rel}$ of 1.89 and a melting point of 110° C. The polyesteramide was press-molded and the physical properties of the product were determined to obtain the results shown in Table 3.

EXAMPLE 6

About 440 parts of substantially colorless polyesteramide was obtained from 109.1 parts of dicarboxylic polyamide C, 304.4 parts of polycaprolactonediol A, 35.4 parts of polycaprolactonetriol C and 0.045 part of tetrabutyl titanate in the same manner as in Example 5.

The obtained polyesteramide had a $\eta_{rel}$ of 1.92 and a melting point of 115° C. The polyesteramide was press-molded and the physical properties of the product were determined to obtain the results shown in Table 3.

TABLE 3

| | Comp. Ex. 2 | Ex 5 | Ex 6 |
|---|---|---|---|
| Hardness, Shore D | 22D | 40D | 42D |
| Tensile properties | | | |
| 100% modulus (kgf/cm$^2$) | 37 | 60 | 48 |
| 300% modulus (kgf/cm$^2$) | 59 | 61 | 48 |
| Breaking strength (kgf/cm$^2$) | 204 | 96 | 48 |
| Elongation at rupture (%) | 1075 | 550 | 436 |
| Elastic recovery (%) | −200 | −145 | −155 |

What is claimed is:

1. A polyesteramide obtained by reacting
   (1) at least one polyamide-forming compound selected from the group consisting of aminocarboxylic acids having from 6 to 12 carbon atoms, lactams having from 6 to 12 carbon atoms and nylon salts prepared by reacting a dicarboxylic acid having from 4 to 12 carbon atoms with a diamine having 4 to 12 carbon atoms;
   (2) a dicarboxylic acid having from 4 to 54 carbon atoms, and
   (3) a reactant selected from the group consisting of
     (a) polycaprolactonediols having an average molecular weight of from 200 to 2,500,
     (b) polycaprolactonediols having an average molecular weight of from 4,500 to 10,000, and
     (c) a mixture of from 70 to 99.9 wt. % of a polycaprolactonediol having an average molecular weight of from 200 to 10,000, and 0.1 to 30 wt. % of a polycaprolactone polyol having an average molecular weight of from 200 to 10,000 and having at least three functional groups in the molecule,
under esterification and polycondensation reaction conditions effective to produce the polyesteramide and wherein during the polycondensation reaction, the amounts of carboxyl groups, amino groups and hydroxyl groups supplied by (1), (2) and (3) satisfy the reaction $$0.95 \leq \frac{[COOH]}{[NH_2] + [OH]} \leq 1.05.$$

2. A polyesteramide as claimed in claim 1 which has been prepared by polycondensation of (1) and (2) and (3).

3. A polyesteramide as claimed in claim 1 which has been prepared by reacting (1) and (2) to form a dicarboxylic acid polyamide and then polycondensing same with (3).

4. A polyesteramide as claimed in claim 1 which has been prepared by reacting (1) and (2) to form a dicarboxylic acid polyamide and then effecting ring-opening polycondensation of said dicarboxylic acid polyamide with ε-caprolactone and an initiator.

5. A polyesteramide as claimed in claim 1 which has been prepared by effecting ring-opening polycondensation reaction of (1), (2), ε-caprolactone and an initiator.

6. A polyesteramide as claimed in claim 1 in which said aminocarboxylic acid is selected from the group consisting of 6-aminocaproic acid, 11-aminoundeconoic acid and 12-aminododecanoic acid, said lactam is selected from the group consisting of caprolactam and lauryllactam and said nylon salt is selected from the group consisting of the salt of adipic acid with hexamethylenediamine, the salt of sebacic acid with hexamethylenediamine, the salt of isophthalic acid with hexamethylenediamine and the salt of terephthalic acid with trimethylhexamethylenediamine.

7. A polyesteramide as claimed in claim 6 in which said dicarboxylic acid is selected from the group consisting of terephthalic acid, isophthalic acid, 1,4-cyclohexanedicarboxylic acid, adipic acid, sebacic acid, dodecanedioic acid and dimer acid.

8. A polyesteramide as claimed in claim 1 in which said reactant (3) is (a).

9. A polyesteramide as claimed in claim 1 in which said reactant (3) is (b).

10. A polyesteramide as claimed in claim 1 in which said reactant (3) is (c).

* * * * *